(12) United States Patent
Nakayama et al.

(10) Patent No.: US 9,214,663 B2
(45) Date of Patent: Dec. 15, 2015

(54) ALKALINE STORAGE BATTERY POSITIVE ELECTRODE, METHOD OF FABRICATING THE SAME, AND ALKALINE STORAGE BATTERY

(75) Inventors: Kosuke Nakayama, Kobe (JP); Ikuo Nagashima, Kobe (JP); Kenjin Higaki, Kakogawa (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 281 days.

(21) Appl. No.: 13/824,923

(22) PCT Filed: Oct. 28, 2011

(86) PCT No.: PCT/JP2011/006036
§ 371 (c)(1),
(2), (4) Date: Jun. 17, 2013

(87) PCT Pub. No.: WO2012/056710
PCT Pub. Date: May 3, 2012

(65) Prior Publication Data
US 2013/0273420 A1 Oct. 17, 2013

(30) Foreign Application Priority Data
Oct. 29, 2010 (JP) .................................. 2010 243488

(51) Int. Cl.
*H01M 4/36* (2006.01)
*H01M 4/52* (2010.01)
(Continued)

(52) U.S. Cl.
CPC .............. *H01M 4/044* (2013.01); *H01M 4/049* (2013.01); *H01M 4/0445* (2013.01); *H01M 4/26* (2013.01);
(Continued)

(58) Field of Classification Search
CPC ....... H01M 4/366; H01M 4/52; H01M 4/044; H01M 4/32; H01M 4/36; H01M 4/0445; H01M 4/049; H01M 4/28; H01M 4/26
See application file for complete search history.

(56) References Cited

U.S. PATENT DOCUMENTS 5,702,844 A * 12/1997 Bernard et al. ............... 429/223
6,083,642 A * 7/2000 Kato et al. ................. 429/218.1
(Continued)

FOREIGN PATENT DOCUMENTS

CN 1691377 A 11/2005
JP 2000-012011 A 1/2000
(Continued)

OTHER PUBLICATIONS

Machine Translation of: Furukawa et al. (JP 2003/257425A), Sep. 12, 2003.*
(Continued)

*Primary Examiner* — Kenneth Douyette
(74) *Attorney, Agent, or Firm* — Marshall, Gerstein & Borun LLP

(57) ABSTRACT

In an alkaline storage battery positive electrode, the surface of positive electrode active material particles is uniformly coated with a conductive agent and the alkaline storage battery positive electrode is capable of suppressing an increase in internal battery resistance.
The method of fabricating includes: (A) fixing active material particles to a current collector, the active material particles containing, as a main component, nickel hydroxide coated with a conductive agent, the conductive agent containing, as a main component, at least one kind of cobalt compound selected from the group consisting of cobalt hydroxide, tricobalt tetroxide, and cobalt oxyhydroxide; and (B) reducing the cobalt atom in the cobalt compound such that the cobalt atom has an oxidation number of less than +2, by applying a reduction current in an electrolyte solution to the current collector to which the active material particles are fixed, after the step (A).

5 Claims, 13 Drawing Sheets

(51) Int. Cl.
  *H01M 4/04* (2006.01)
  *H01M 4/32* (2006.01)
  *H01M 4/28* (2006.01)
  *H01M 4/26* (2006.01)

(52) U.S. Cl.
  CPC  *H01M 4/28* (2013.01); *H01M 4/32* (2013.01); *H01M 4/366* (2013.01); *H01M 4/52* (2013.01); *Y02E 60/124* (2013.01)

(56) References Cited

U.S. PATENT DOCUMENTS

| | | | |
|---|---|---|---|
| 6,114,063 A * | 9/2000 | Katsumoto et al. | 429/223 |
| 2003/0134199 A1 * | 7/2003 | Christian et al. | 429/223 |
| 2005/0238960 A1 | 10/2005 | Nakamura et al. | |
| 2006/0166099 A1 * | 7/2006 | Okabe et al. | 429/232 |
| 2009/0047576 A1 * | 2/2009 | Okabe et al. | 429/174 |
| 2009/0291362 A1 * | 11/2009 | Yamaguchi | 429/162 |

FOREIGN PATENT DOCUMENTS

| | | |
|---|---|---|
| JP | 2001-102085 A | 4/2001 |
| JP | 2003-257425 A | 9/2003 |
| JP | 2007-157479 A | 6/2007 |

OTHER PUBLICATIONS

Machine Translation of: Tadokoro et al. (JP 2000/012011A), Jan. 14, 2000.*
Office Action for Chinese Patent Application No. 201180046793.5, dated Mar. 13, 2015.
International Search Report for PCT/JP2011/006036, mailed Feb. 14, 2012.

* cited by examiner

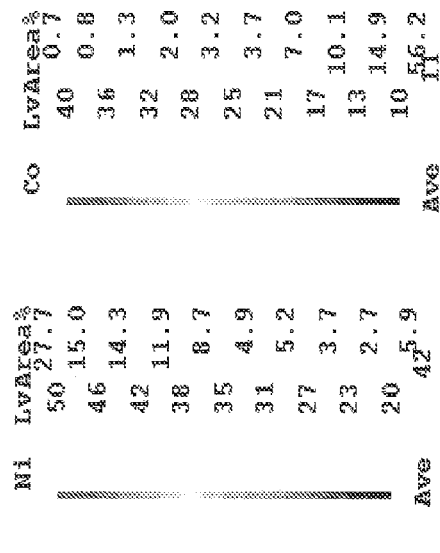
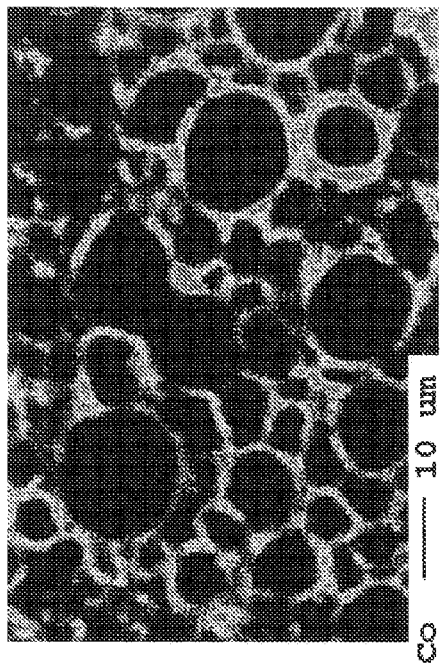
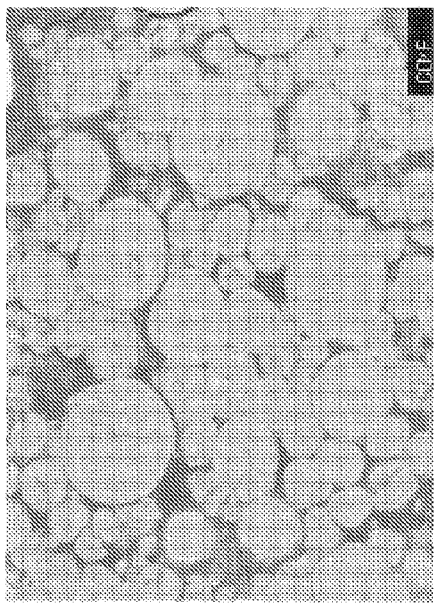
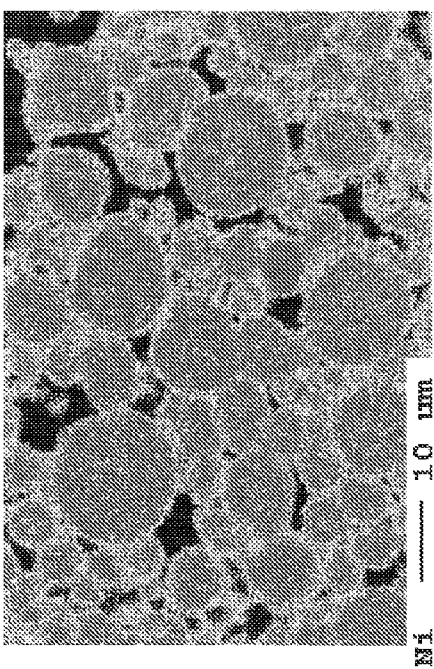
Fig. 9

ALKALINE STORAGE BATTERY POSITIVE ELECTRODE, METHOD OF FABRICATING THE SAME, AND ALKALINE STORAGE BATTERY

TECHNICAL FIELD

The present invention relates to an alkaline storage battery positive electrode and a method of fabricating the same. The alkaline storage battery positive electrode contains nickel hydroxide as a main active material and a cobalt compound as a conductive agent. The present invention also relates to an alkaline storage battery including the alkaline storage battery positive electrode.

BACKGROUND ART

Conventionally, there have been proposed various rechargeable secondary batteries that are mainly used as a power source for a portable device. In addition, in recent years, from the standpoint of environmental considerations, development has been conducted on high-capacity secondary batteries to be used for load leveling in natural energy power generation such as wind power generation or solar power generation, or to be used as a power source for a vehicle such as an automobile or electric train. In the field of natural energy, secondary batteries are used mainly for equalizing energy generation with energy supply. In a case where a secondary battery is installed in a vehicle, regenerative electric power that is generated when the brake is applied is stored in the in-vehicle secondary battery, and the stored electric power can be used as a source of power for the vehicle. Accordingly, the operating energy efficiency of the vehicle can be improved. For example, a nickel-metal hydride secondary battery, which is one of the types of alkaline storage batteries, is considered to be suitable as such an in-vehicle secondary battery when various conditions such as energy density, load following capability, durability, and manufacturing cost are taken into account (see Patent Literature 1, for example).

Secondary batteries for industrial use such as in-vehicle secondary batteries are required to have very high durability. Nickel-metal hydride secondary batteries are commonly used as industrial use secondary batteries. One of the factors that cause degradation in the charge/discharge performance of a nickel-metal hydride secondary battery is an increase in the internal resistance of the battery. Nickel hydroxide ($Ni(OH)_2$), which is used as a main active material of the positive electrode of a nickel-metal hydride secondary battery, is oxidized at the time of charging and thereby transforms into nickel oxyhydroxide (NiOOH). Nickel hydroxide is an insulating material whereas nickel oxyhydroxide is a semiconducting material. Therefore, the higher the state of charge (SOC) of a secondary battery becomes, the lower the internal resistance of the secondary battery becomes.

It is necessary to maintain electrical conductivity within the electrode (positive electrode) even when the SOC is low. For this reason, nickel hydroxide coated with cobalt hydroxide ($Co(OH)_2$) serving as a conductive agent has been put in practical use as a positive electrode active material (see Patent Literature 2, for example). As shown in FIG. 9, Patent Literature 2 discloses that cobalt hydroxide particles are added in such a manner that the surface of aggregates (secondary particles) of nickel hydroxide particles (primary particles) is coated with the cobalt hydroxide particles. When oxidized at the time of charging of the secondary battery, the cobalt hydroxide transforms into electrically conductive cobalt oxyhydroxide (CoOOH). In the lower right image in FIG. 9, a white portion seen on the surface of a black aggregate (secondary particle) of nickel hydroxide particles is a cobalt compound. In FIG. 10, a substantially spherical large-diameter particle is an aggregate (secondary particle) of nickel hydroxide particles, and particles in a crushed state that surround the aggregate are nickel hydroxide particles (primary particles). Reduction of cobalt oxyhydroxide does not occur in a normal working voltage range of a secondary battery. Therefore, a certain level of electrical conductivity can be maintained within the electrode (positive electrode) even when the SOC is low.

CITATION LIST

Patent Literature

PTL: 1 Japanese Laid-Open Patent Application Publication No. 2007-157479
PTL: 2 Japanese Laid-Open Patent Application Publication No. 2003-257425

SUMMARY OF INVENTION

Technical Problem

However, in a positive electrode using the positive electrode active material disclosed in Patent Literature 2, the cobalt compound coating, which is formed on the surface of the nickel hydroxide particles serving as the positive electrode active material, is not uniformly distributed on the surface of the nickel hydroxide particles. For this reason, stability of a conductive network formed among the positive electrode active material particles is insufficient. Therefore, the conductive network among the positive electrode active material particles is destroyed as the number of performed charge/discharge cycles of the secondary battery increases. Consequently, the internal resistance of the positive electrode increases in a low SOC range. Therefore, the secondary battery cannot have a sufficient battery life in terms of repeated charge/discharge cycles.

The present invention has been made in order to solve the above problems. An object of the present invention is to provide an alkaline storage battery positive electrode, which is capable of suppressing an increase in the internal resistance of a secondary battery, and to provide a method of fabricating the positive electrode. Another object of the present invention is to provide an alkaline storage battery including the positive electrode.

Solution to Problem

The inventors of the present invention obtained the following findings: when nickel hydroxide particles whose surface is coated with a cobalt compound such as cobalt hydroxide serving as a conductive agent are fixed to a current collector as active material particles and then a reduction current is applied to the current collector in an electrolyte solution, the cobalt compound is reduced and microparticulated such that the cobalt compound is uniformly distributed on the surface of the nickel hydroxide particles (secondary particles). As a result, the inventors of the present invention conceived of the present invention.

Specifically, the present invention is a method of fabricating an alkaline storage battery positive electrode. The method includes the steps of: (A) fixing active material particles to a current collector, the active material particles containing, as a main component, nickel hydroxide whose surface is coated with a conductive agent, the conductive agent containing, as a main component, at least one kind of cobalt compound selected from the group consisting of cobalt hydroxide, tricobalt tetroxide, and cobalt oxyhydroxide; and (B) reducing the cobalt atom in the cobalt compound such that the cobalt atom has an oxidation number of less than +2, by applying a reduction current in an electrolyte solution to the current collector to which the active material particles are fixed, after the step (A).

According to this method, the cobalt compound serving as a conductive agent is partially dissolved and dispersed in the electrolyte solution due to the reduction current. The active material particles are formed as aggregates (secondary particles), each of which is formed as a result of fine primary particles gathering together. A part of the cobalt compound dissolved and dispersed in the electrolyte solution is uniformly dispersed on the surface of the active material aggregates (active material secondary particles) as metallic cobalt microparticles, or as cobalt compound microparticles in which the cobalt atom has an oxidation number of less than +2.

Further, the metallic cobalt microparticles, or the cobalt compound microparticles in which the cobalt atom has an oxidation number of less than +2, are partially deposited within the active material aggregates. As a result, a significantly strong conductive network is formed among the positive electrode active material particles. Consequently, an increase in the internal resistance of an alkaline storage battery using the positive electrode is suppressed. That is, in the present invention, the surface of the positive electrode active material particles is uniformly coated with the conductive agent, and a strong conductive network is formed among the positive electrode active material particles.

Preferably, the method of fabricating an alkaline storage battery positive electrode according to the present invention further includes: (C) oxidizing the cobalt compound into tricobalt tetroxide or cobalt oxyhydroxide by applying a current in a charging direction to the current collector to which the active material particles are fixed, after the step (B). As a result of performing the step (C), the metallic cobalt microparticles, or the cobalt compound microparticles in which the cobalt atom has an oxidation number of less than +2, formed in the step (B), are oxidized into tricobalt tetroxide or cobalt oxyhydroxide. Consequently, unlike conventional positive electrodes in which nickel hydroxide aggregates whose surface is coated with a cobalt compound are used as a positive electrode active material, a positive electrode in which tricobalt tetroxide or cobalt oxyhydroxide serving as a conductive agent is uniformly dispersed on the outer surface of and within the nickel hydroxide aggregates is obtained. The positive electrode obtained after performing the step (C) can immediately function as an alkaline storage battery positive electrode.

In the method of fabricating an alkaline storage battery positive electrode according to the present invention, it is preferred that the step (B) is performed before alkaline storage battery activation (i.e., activation of an alkaline storage battery including the positive electrode obtained through the step (A)). According to this method, the surface of the positive electrode active material particles is uniformly coated with tricobalt tetroxide or cobalt oxyhydroxide before the activating step where the metallic cobalt, or the cobalt compound in which the cobalt atom has an oxidation number of less than +2, is highly oxidized into tricobalt tetroxide or cobalt oxyhydroxide serving as a conductive agent. Therefore, in the following activating step of the alkaline storage battery, a significantly strong conductive network is formed.

Preferably, in the step (B), at least 1 atomic % of the conductive agent is formed as metallic cobalt particles having a particle diameter of not less than 1 nm and not more than 3 nm, or formed as cobalt compound particles in which the cobalt atom has an oxidation number of less than +2.

If the metallic cobalt microparticles, or the cobalt compound microparticles in which the cobalt atom has an oxidation number of less than +2, formed in the step (B), have a particle diameter of not less than 1 nm and not more than 3 nm, then the microparticles tend to be uniformly dispersed and deposited not only on the surface of the positive electrode active material aggregates but also within the positive electrode active material aggregates. Here, the particle diameter of not less than 1 nm and not more than 3 nm refers to the primary particle diameter of the metallic cobalt or the cobalt compound.

Preferably, in the step (C), 30 atomic % (at %) or more of the cobalt compound is formed as tricobalt tetroxide. According to this method, the conductive agent contains tricobalt tetroxide, which is highly electrically conductive, as a main compound. As a result, the internal resistance of the storage battery is suppressed more effectively. Here, atomic % refers to, among particular atoms contained in a compound, a proportion of the atoms forming a particular compound.

The present invention also relates to an alkaline storage battery positive electrode (referred to as a first alkaline storage battery positive electrode) including: a current collector; and active material particles fixed to a surface of the current collector. The active material particles are aggregates of active material particles containing nickel hydroxide as a main component, each aggregate having a surface uniformly coated with metallic cobalt particles serving as a conductive agent. At least part of the conductive agent particles have a particle diameter of not less than 1 nm and not more than 3 nm. At least part of the conductive agent particles are deposited within the aggregates of the active material particles. The active material particles are connected to each other via the conductive agent.

Preferably, in the first alkaline storage battery positive electrode, 1 atomic % (at %) or more of the conductive agent particles are metallic cobalt particles.

The present invention further relates to an alkaline storage battery positive electrode (referred to as a second alkaline storage battery positive electrode) including: a current collector; and active material particles fixed to a surface of the current collector. The active material particles are aggregates of active material particles containing nickel hydroxide as a main component, each aggregate having a surface uniformly coated with at least one kind of conductive agent particles selected from the group consisting of tricobalt tetroxide particles and cobalt oxyhydroxide particles. At least part of the conductive agent particles have a particle diameter of not less than 1 nm and not more than 3 nm. At least part of the conductive agent particles are deposited within the aggregates of the active material particles. The active material particles are connected to each other via the conductive agent.

Preferably, in the second alkaline storage battery positive electrode, 30 atomic % or more of the conductive agent particles are metallic cobalt tricobalt tetroxide particles.

Still further, the present invention relates to an alkaline storage battery including the first alkaline storage battery positive electrode or the second alkaline storage battery positive electrode.

The alkaline storage battery according to the present invention includes the first alkaline storage battery positive electrode or the second alkaline storage battery positive electrode. According to this configuration, a strong conductive network is formed among the active material particles of the positive electrode. Therefore, even after charging and discharging are repeated, an increase in the internal resistance of the battery is suppressed. Thus, the battery performance, particularly the battery life in terms of repeated charge/discharge cycles, of the alkaline storage battery according to the present invention is significantly improved compared to conventional alkaline storage batteries.

Advantageous Effects of Invention

As described above, according to the alkaline storage battery positive electrode of the present invention, the surface of the aggregates of active material particles is uniformly coated with the microparticles of the cobalt compound serving as a conductive agent, and in addition, the microparticles of the cobalt compound are deposited within the active material aggregates. As a result, a strong conductive network is formed among the active material particles of the positive electrode. Consequently, even after charge/discharge cycles are repeated, an alkaline storage battery including the positive electrode of the present invention can maintain low internal resistance.

BRIEF DESCRIPTION OF DRAWINGS

FIG. 9 shows SEM-EDX observation images of nickel hydroxide particles (conventional art) coated with cobalt hydroxide.

DESCRIPTION OF EMBODIMENTS

Hereinafter, one embodiment of the present invention is described with reference to the drawings as necessary. The present invention is not limited by the embodiment described below.

Figure 1:
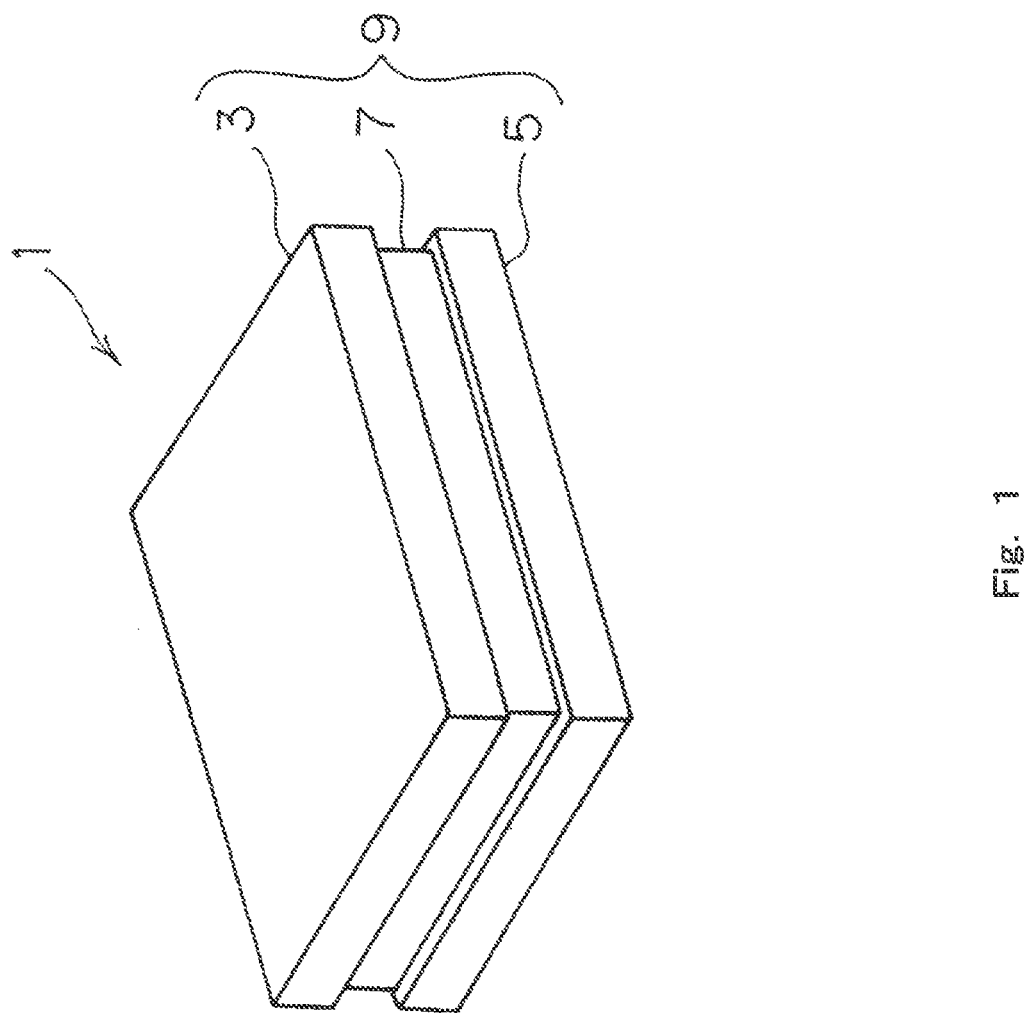
FIG. 1 is a perspective view showing an example of an alkaline storage battery to which an alkaline storage battery positive electrode according to the present invention is applied.

FIG. 1 shows a perspective view of a rectangular alkaline storage battery 1, which includes an alkaline storage battery positive electrode according to the present invention. The alkaline storage battery 1 is configured as a nickel-metal hydride secondary battery in which: nickel hydroxide is used as a main active material of the positive electrode; a hydrogen storage alloy is used as a main active material of the negative electrode; and an alkaline aqueous solution is used as an electrolyte solution. A rectangular first cover member 3 and a rectangular second cover member 5 which also serve as a positive electrode current collector and a negative electrode current collector, and a framework member 7 formed of an insulating material and interposed between the first cover member 3 and the second cover member 5, form a rectangular casing 9 of the alkaline storage battery 1.

Figure 2:
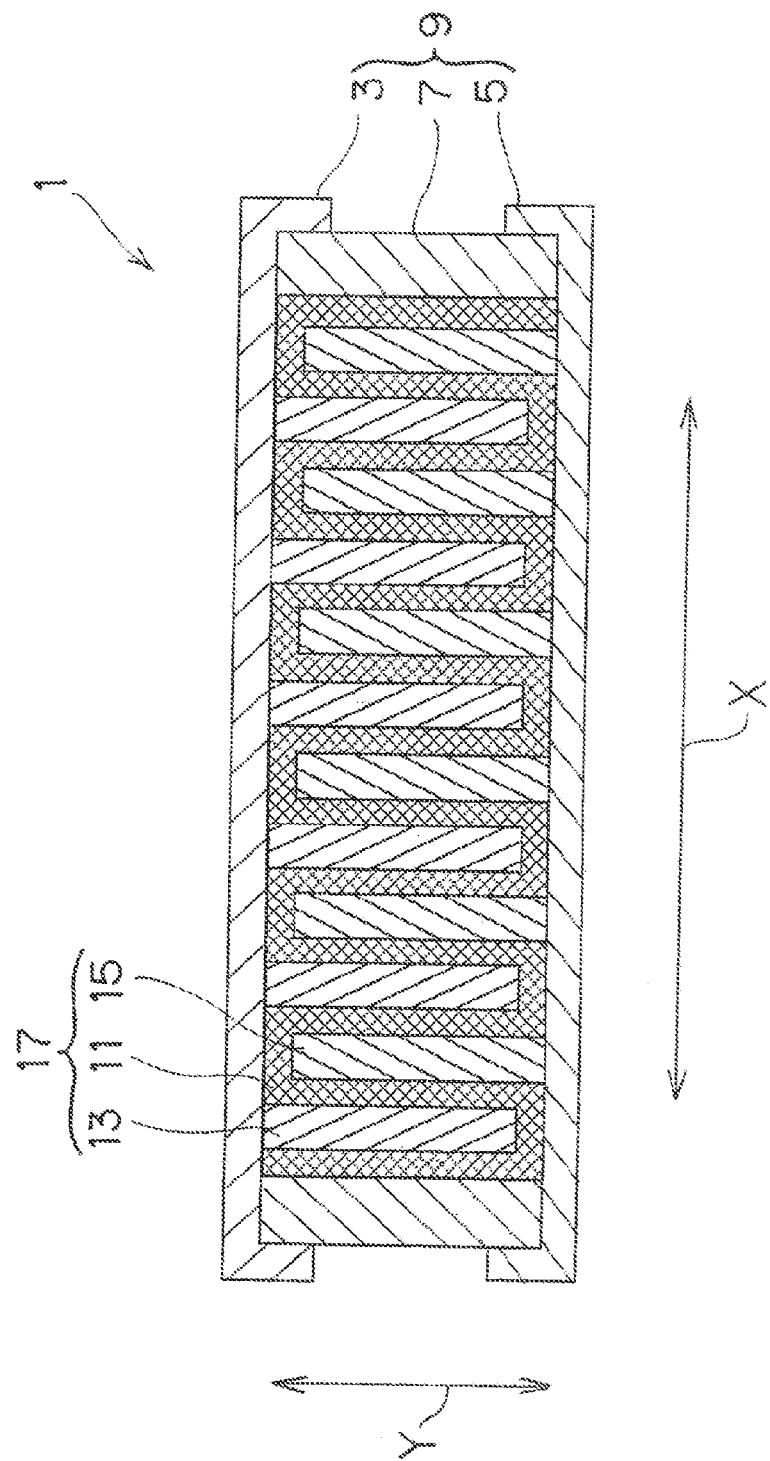
FIG. 2 is a cross-sectional view illustrating an electrode structure within the alkaline storage battery of FIG. 1.

As schematically shown in a cross-sectional view of FIG. 2, the casing 9 accommodates therein electrode units 17, each of which includes: a separator 11 folded in a pleat-like form; and electrodes that are a positive electrode 13 and a negative electrode 15. The positive electrode 13 is formed by injecting a positive electrode mixture into a positive electrode substrate made of porous nickel foam. Similarly, the negative electrode 15 is formed by injecting a negative electrode mixture into a negative electrode substrate made of porous perforated metal.

The positive electrode 13 and the negative electrode 15 are alternately stacked in a direction X in which the electrodes 13 and 15 are opposed to each other while the separator 11 is interposed between the electrodes 13 and 15. The electrode units 17 thus formed are arranged within the casing 9, such that the stacking direction X is orthogonal to a direction Y in which the first and second cover members 3 and 5 are opposed to each other.

The alkaline storage battery 1 is one example of a nickel-metal hydride secondary battery in which the alkaline storage battery positive electrode according to the present invention is used. The alkaline storage battery positive electrode according to the present invention does not limit the shape (e.g., cylindrical or rectangular) of the alkaline storage battery including the positive electrode. Also, the alkaline storage battery positive electrode according to the present invention is not limited to a spiral wound type or a stacked type, but may have a different structure.

An electrically conductive material, specifically, a porous member such as nickel foam or perforated metal, or a flat plate member such as a nickel-plated steel plate, may be used as a positive electrode substrate or a negative electrode substrate. In a case where a flat plate member is used as a positive electrode substrate or a negative electrode substrate, a positive electrode mixture or a negative electrode mixture is applied onto the substrate. In this case, the material of the positive electrode substrate or the negative electrode substrate is not limited to a nickel-plated steel plate but may be suitably selected by taking account of electrochemical characteristics, mechanical strength, and corrosion resistance. Examples of the preferred material include a nickel plate, stainless steel plate, copper-plated steel plate, silver-plated steel plate, cobalt-plated steel plate, and a chrome-plated steel plate.

The positive electrode mixture is prepared by mixing the following main components: nickel hydroxide serving as a positive electrode active material; a conductive agent; and a binder. The negative electrode mixture is prepared by mixing the following main components: a hydrogen storage alloy serving as a negative electrode active material; a conductive agent; and a binder.

Preferably, the separator 11 is formed of an alkali-resistant hydrophilic material. For example, polyolefin-based fiber such as polyethylene fiber or polypropylene fiber, polyphenylene sulfide fiber, polyfluoroethylene-based fiber, polyamide-based fiber, or any of these kinds of fibers that is hydrophilically treated may be preferably used. An alkaline aqueous solution, for example, KOH aqueous solution, NaOH aqueous solution, or LiOH aqueous solution, can be used as an electrolyte solution.

Next, the structure of the alkaline storage battery positive electrode 13 according to the present invention is described in detail.

Figure 3:
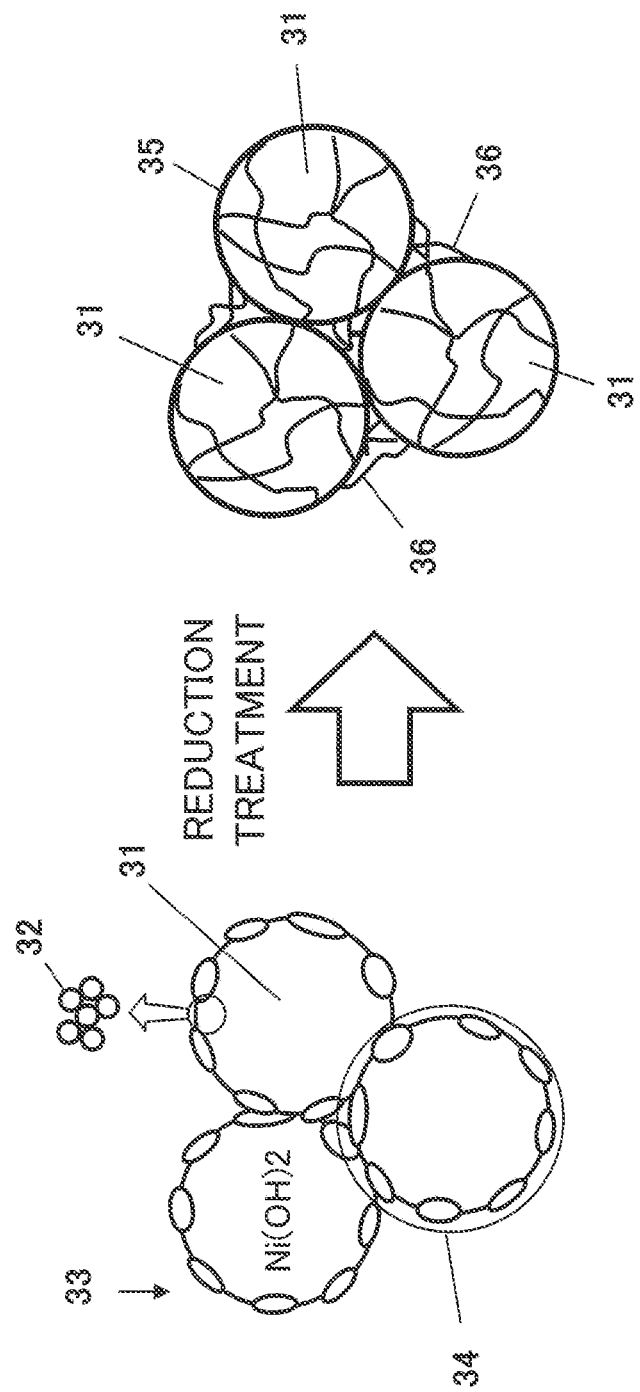
FIGS. 3A and 3B are conceptual diagrams schematically illustrating changes occurring in a conductive agent in step (B) of a method of fabricating the alkaline storage battery positive electrode according to the present invention.

As described above, in the alkaline storage battery positive electrode 13 according to the present invention, nickel hydroxide ($Ni(OH)_2$) is used as a positive electrode active material, and at least one kind of cobalt compound selected from the group consisting of cobalt hydroxide, tricobalt tetroxide, and cobalt oxyhydroxide is used as a conductive agent. As schematically shown in FIG. 3A, positive electrode active material particles 31 are formed as secondary particles (aggregates), each of which is an aggregate of primary particles 32 which are fine nickel hydroxide particles. The surface of the positive electrode active material particles 31 is non-uniformly coated with conductive agent particles 33 containing the at least one kind of cobalt compound selected from the group consisting of cobalt hydroxide, tricobalt tetroxide, and cobalt oxyhydroxide.

Next, positive electrode active material particles 34 shown in FIG. 3A, which are coated with the conductive agent, are fixed to a current collector, and a reduction current is applied to the current collector in an electrolyte solution (step (B)). As a result of the application of the reduction current, the conductive agent particles 33 are reduced, and dissolved and dispersed into the electrolyte solution. Consequently, as shown in FIG. 3B, conductive agent microparticles 35 having a particle diameter of not less than 1 nm and not more than 3 nm are uniformly deposited not only on the surface of the positive electrode active material particles 31 but also within the positive electrode active material particles 31. As a result, the positive electrode active material particles 31 are in contact with each other via the conductive agent microparticles 35, and thereby a strong conductive network 36 is formed and reaction resistance of the positive electrode is reduced.

Next, one example of a method of fabricating the alkaline storage battery positive electrode according to the present invention is described.

First, nickel hydroxide ($Ni(OH)_2$) particles whose surface is coated with cobalt hydroxide ($Co(OH)_2$) are dissolved into a solvent together with a binder, and the mixture is formed into a paste. The paste is injected into a porous positive electrode substrate. Thereafter, the paste is dried and rolled out to form a positive electrode precursor (step (A)). Alternatively, the paste may be applied onto a plate-shaped positive electrode substrate, and then the paste may be dried to form a positive electrode precursor.

Next, in an electrolyte solution, a reduction current is applied to the positive electrode precursor formed in the above manner (step (B)). A method used for applying the reduction current to the positive electrode precursor may be, for example, either a method a) or a method b), which will be described below. However, the method used for applying the reduction current to the positive electrode precursor is not limited to these methods but may be any method so long as the method allows the reduction current to be applied to the positive electrode precursor under desired conditions. In a working example which will be described below, the reduction current was applied to the positive electrode precursor by using the method a).

Method a): the positive electrode precursor, and a counter electrode which is formed of platinum, nickel, or stainless steel, are immersed in an electrolyte solution poured in a container; and a predetermined amount of reduction current is applied to the positive electrode precursor.

Method b): an alkaline storage battery such as one shown in FIG. 1 is assembled; an electrolyte solution is injected into the battery; and a predetermined amount of reduction current is applied to the positive electrode of the alkaline storage battery.

In a case where the step (B) is performed by using the method b), the alkaline storage battery may be disassembled after the step (B), and after replacing the negative electrode with a new one, the alkaline storage battery 1 may be re-assembled as a finished product.

When the method b) is used, there is a case where the negative electrode is oxidized and degraded. Therefore, it is preferred to perform the re-assembling to replace the degraded negative electrode with a new non-degraded negative electrode. However, depending on the conditions for applying the reduction current, the degree of degradation of the negative electrode may be small and negligible. In such a case, the alkaline storage battery may be treated as a finished product without performing the re-assembling.

The current application conditions in the step (B) are not particularly limited, so long as the conditions allow the cobalt atom in the cobalt compound to be reduced, such that the cobalt atom has an oxidation number of less than +2. However, it is preferred that the cobalt atom in the cobalt compound is reduced such that the cobalt atom has an oxidation number of 0, i.e., reduced to the state of metallic cobalt. As a result of going through these steps, the conductive agent is, at least partially, dissolved and dispersed in the electrolyte solution, and thereafter, deposited as microparticles having a particle diameter of approximately 1 to 3 nm. Consequently, as shown in FIG. 3B, conductive agent particles (metallic cobalt particles, or cobalt compound particles in which the cobalt atom has an oxidation number of less than +2) are deposited, with highly uniform distribution, on the surface of and within the positive electrode active material particle aggregates (secondary particles).

In the step (B), the current application may be performed by using a constant current, constant voltage, or constant power, or a different current application method may be used. If the current is applied by using a constant current method, the applied current is preferably in a value range from 5 to 300 mA/g-$Ni(OH)_2$, and more preferably in a value range from 5 to 100 mA/g-$Ni(OH)_2$. On the other hand, if the current is applied by using a constant voltage method, the voltage is preferably in a value range from −0.1 to −3.0 V with respect to a Ag/AgCl reference electrode, and more preferably in a value range from −0.5 to −1.8 V. Although the step (B) is performable at a normal temperature, the environmental temperature is preferably in a range from 20 to 40° C., and more preferably in a range from 25 to 35° C.

Preferably, the step (B) is performed before an activating step in the fabrication process of the alkaline storage battery. The activating step of the alkaline storage battery is a step of charging and discharging the battery a predetermined number of times in order to activate the battery after assembling the battery. Before the activating step where the cobalt compound is highly oxidized into, for example, tricobalt tetroxide which serves as a conductive agent, the surface of the positive electrode active material particles is uniformly coated with the metallic cobalt particles or the cobalt compound particles in which the cobalt atom has an oxidation number of less than +2. Therefore, in the following activating step, a significantly strong conductive network can be formed.

The amount of the conductive agent added to the positive electrode active material is preferably such that not less than 5 parts by weight and not more than 30 parts by weight of the conductive agent is added to 100 parts by weight of the positive electrode active material, and more preferably, not less than 8 parts by weight and not more than 15 parts by weight of the conductive agent is added to 100 parts by weight of the positive electrode active material. If the amount of the conductive agent added to 100 parts by weight of the positive electrode active material is less than 5 parts by weight, then a sufficient conductivity assisting effect cannot be obtained, resulting in low utilization of the positive electrode active material. On the other hand, if the amount of the conductive agent added to 100 parts by weight of the positive electrode active material is more than 30 parts by weight, then the alkaline storage battery cannot have sufficient energy density.

The method of fabricating the alkaline storage battery positive electrode according to the present invention provides advantageous effects as described below.

As schematically shown in FIGS. 3A and 3B, in the method of fabricating the alkaline storage battery positive electrode according to the present invention, the conductive agent 33 containing a cobalt compound as a main component is micronized at the surface of and within the positive electrode active material particles 31 (secondary particles) by going through the reduction treatment in the step (B). As a result, the strong conductive network 36 is formed among the positive electrode active material particles 31. Accordingly, in an alkaline storage battery using the positive electrode according to the present invention, an increase in the internal resistance is suppressed and the battery exhibits superior performance to conventional alkaline storage batteries that include a positive electrode using the same positive electrode active material and conductive agent.

In the method of fabricating the alkaline storage battery positive electrode according to the present invention, the cobalt compound is microparticulated in the step (B) (positive electrode reduction step), and the positive electrode obtained after performing the step (B) was confirmed to have high conductivity through a validation test described below. In a cyclic voltammetry measurement conducted prior to the validation test, the reduction treatment in the step (B) was confirmed to act not on the positive electrode active material (nickel hydroxide) of the positive electrode precursor but on the cobalt compound in the conductive agent. Therefore, in the validation test, in order to focus on confirming the oxidation state of cobalt, a positive electrode was fabricated by only using cobalt hydroxide without using nickel hydroxide, and the test was conducted by using the positive electrode.

A test cell was fabricated by using: the positive electrode containing cobalt hydroxide as a main component; a negative electrode formed of a hydrogen storage alloy; a sulfonated polypropylene separator; and an electrolyte solution which is a 6M KOH aqueous solution. The positive electrode containing cobalt hydroxide as a main component was fabricated by: mixing 50 mg of $Co(OH)_2$ powder and 22.2 μL of 2 mass % polyvinyl alcohol solution; injecting the mixture into a nickel foam substrate; and vacuum drying the substrate. By using the test cell, a step of applying a reduction current to the positive electrode (i.e., a positive electrode reduction step corresponding to the step (B)) and an initial activating step of the alkaline storage battery were performed. A cell fabricated in the same manner as that of the above test cell, except that the positive electrode reduction step was not performed on the cell, was prepared as a comparative cell. The positive electrodes of the two respective cells were charged at a constant current, and TEM (transmission electron microscopy) observation, XRD (X-ray diffractometry), and XPS (X-ray photoemission spectroscopy) were conducted on the positive electrodes for different states of charge.

Through the validation test, the following results were confirmed or inferred.

(1) TEM Observation

Figure 4:
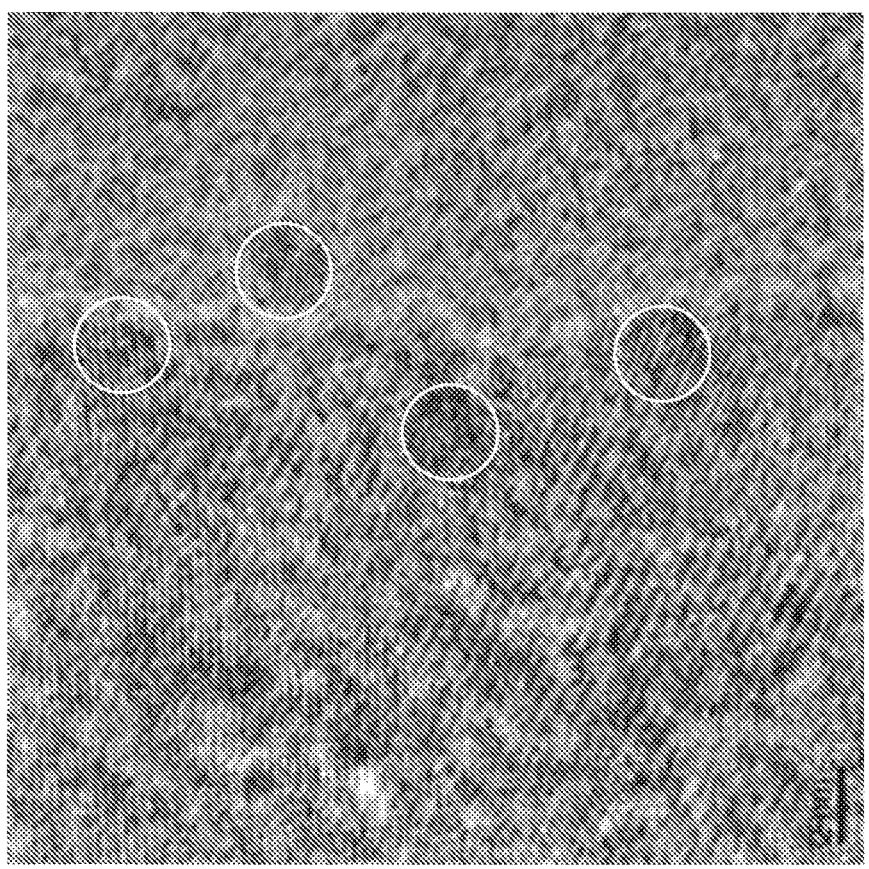
FIG. 4 shows a TEM observation image of the alkaline storage battery positive electrode according to the present invention.

As shown in a TEM image in FIG. 4, after the positive electrode reduction step had been performed, metallic cobalt microparticles having a particle diameter of approximately 1 to 3 nm were formed on the surface of cobalt hydroxide particles. Such microparticles are not only deposited on the surface of nickel hydroxide aggregates (secondary particles) serving as a positive electrode active material but also deposited on the surface of primary particles within the secondary particles to enter internal gaps of the secondary particles.

(2) XRD

Figure 5:
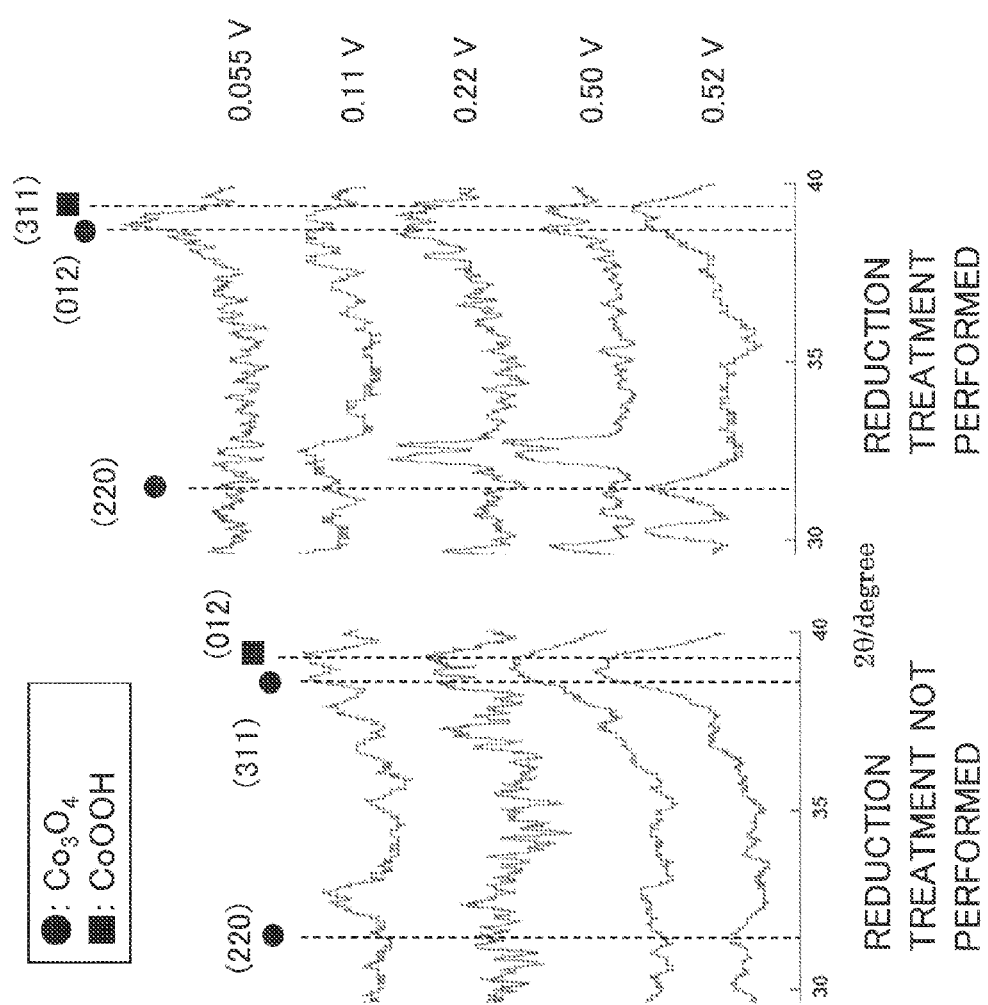
FIG. 5 shows graphs relating to XPS results on the alkaline storage battery positive electrode according to the present invention.

A current was applied to the positive electrodes in the charging direction. As shown in FIG. 5, at high potentials, the presence of only CoOOH was confirmed on the surface of cobalt hydroxide particles that had not gone through the positive electrode reduction step. In FIG. 5, (220), (311), and (012) indicate crystal plane Miller indices. On the other hand, on the surface of cobalt hydroxide particles that had gone through the positive electrode reduction step, the presence of both CoOOH and $Co_3O_4$ was confirmed even at the high potentials. The XRD diffraction peaks of the $Co_3O_4$ coincide with the diffraction peaks of spinel-structured $Co_3O_4$ which exhibits high electrical conductivity. Thus, it is suggested that on the surface of cobalt hydroxide particles that go through the positive electrode reduction step, the metallic Co particles are oxidized into highly electrically conductive $Co_3O_4$ particles which are then further oxidized into CoOOH particles.

(3) XPS

Figure 6B:
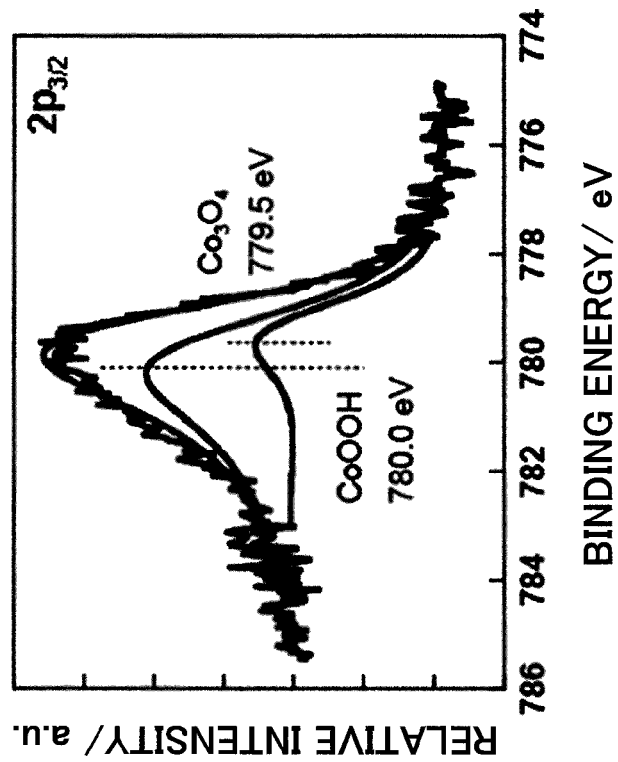
FIGS. 6A and 6B show graphs relating to XRD results on the alkaline storage battery positive electrode according to the present invention.
Figure 6A:
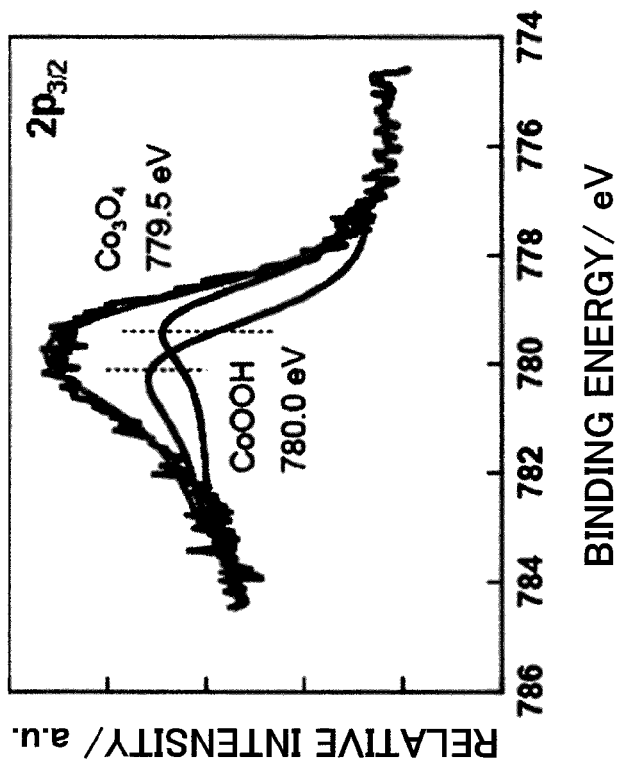

FIGS. 6A and 6B show results of XPS analysis of the composition of cobalt compounds existing on the surface of the cobalt hydroxide particles. FIG. 6A shows an XPS profile of the positive electrode on which the positive electrode reduction step was performed. FIG. 6B shows an XPS profile of the positive electrode on which the positive electrode reduction step was not performed. Table 1 shows both the profiles indicated in FIGS. 6A and 6B. As shown in Table 1, after charging, the composition of the cobalt compounds that have gone through the positive electrode reduction step exhibits a higher proportion of $Co_3O_4$ than the composition of the cobalt compounds that have not gone through the positive electrode reduction step. From this, it is considered that the cobalt compounds are micronized and dispersed through the positive electrode reduction step, and after the charging, a large portion of the dispersed cobalt compounds exists as highly electrically conductive $Co_3O_4$. It is suggested that after the charging, the proportion of $Co_3O_4$ in the composition of the conductive agent is preferably 30 atomic % (at %) or more, and more preferably 50 atomic % (at %) or more.

TABLE 1

After-Charge Cobalt Compound Composition Ratio Obtained by XPS Waveform Separation

| Compound kind | Positive electrode reduction step performed | Positive electrode reduction step not performed |
|---|---|---|
| $Co_3O_4$ | 54.0 at % | 29.8 at % |
| CoOOH | 46.0 at % | 70.2 at % |

Figure 7B:
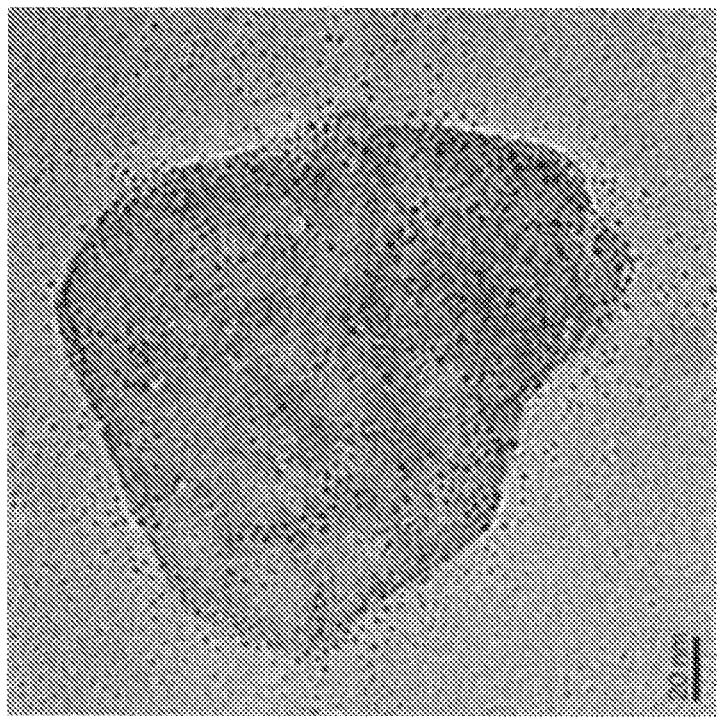
FIGS. 7A and 7B show TEM observation images of the alkaline storage battery positive electrode according to the present invention.
Figure 7A:
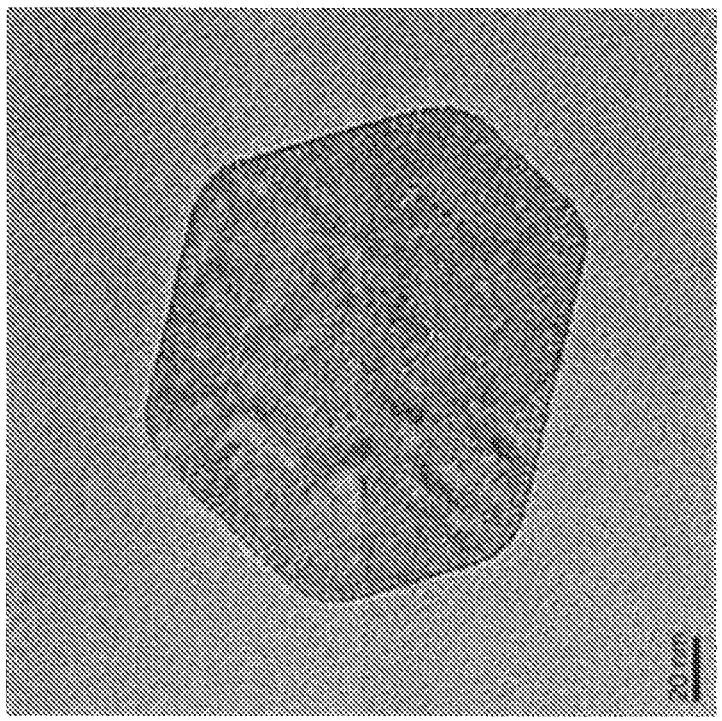

It is considered that the phenomenon described above in (1) is caused by a reaction mechanism as described below. As shown in FIG. 7A, the TEM image of the $Co(OH)_2$ electrode on which the positive electrode reduction step had not been performed was confirmed to be a hexagonal shape. On the other hand, immediately after the positive electrode reduction step was performed on the $Co(OH)_2$ electrode, the TEM image of the $Co(OH)_2$ electrode was confirmed to be a distorted hexagonal shape as shown in FIG. 7B. The reason for this is considered as follows: $Co(OH)_2$ was dissolved in the electrolyte solution due to a reaction represented by Chemical Formula 1 below, so that a hydroxy complex was formed.

$$Co(OH)_2 + 2OH^- \rightarrow Co(OH)_4^{2-} \quad \text{Chemical Formula 1:}$$

Further, it is considered that metallic cobalt microparticles were formed as a result that the hydroxy complex formed through the reaction of Chemical Formula 1 was re-deposited on the bulk surface of $Co(OH)_2$ as $Co(OH)_2$ microparticles which were then reduced through a reaction represented by Chemical Formula 2 below,

$$Co(OH)_2 + 2e^- \rightarrow Co + 2OH^- \quad \text{Chemical Formula 2:}$$

or as a result that the hydroxy complex was directly reduced through a reaction represented by Chemical Formula 3 below.

$$Co(OH)_4^{2-} + 2e^- \rightarrow Co + 4OH^- \quad \text{Chemical Formula 3:}$$

Hereinafter, a working example of present invention is described in detail. However, the present invention is not limited by the description given below.

WORKING EXAMPLE (Fabrication of Test Battery)

A test battery (nickel-metal hydride secondary battery) having the specifications as indicated below was fabricated as a working example of the present invention.

Battery capacity: 3.6 Ah
Positive electrode active material: cobalt-coated nickel hydroxide (on which step (B) was performed)
Negative electrode active material: ABS hydrogen storage alloy
Separator: polyolefin nonwoven fabric
Electrolyte solution: aqueous solution of KOH 6M/LiOH 0.4M

Comparative Example

A nickel-metal hydride secondary battery having the same specifications as the battery according to the working example, except that the step (B) was not performed on the positive electrode, was fabricated as a battery according to a comparative example.

(Charge/Discharge Cycle Test)

Charge/discharge cycle tests were conducted on the nickel-metal hydride secondary battery according to the working example and the nickel-metal hydride secondary battery according to the comparative example. The charge/discharge cycle tests were conducted under the following charge/discharge conditions:

Current value: 42.7 mA/g-$Ni(OH)_2$
Charge/discharge amount: 80%

Charging and discharging were repeated under the above conditions, and a capacity retention rate relative to the initial capacity at the 0th cycle (prior to the start of the charge/discharge test) was measured at the 600th cycle and 1000th cycle.

Figure 8:
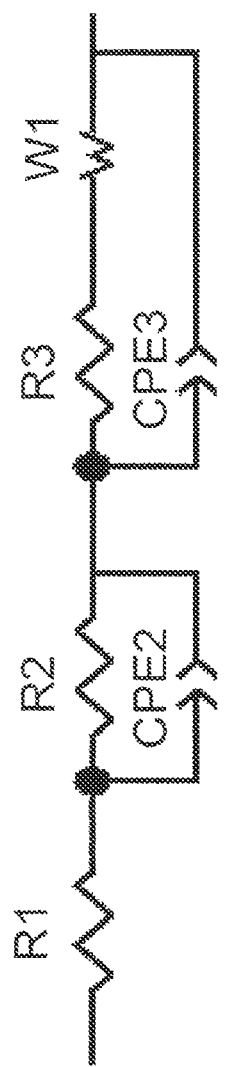
FIG. 8 is a circuit diagram showing an equivalent circuit used in impedance analysis.
Figure 10:
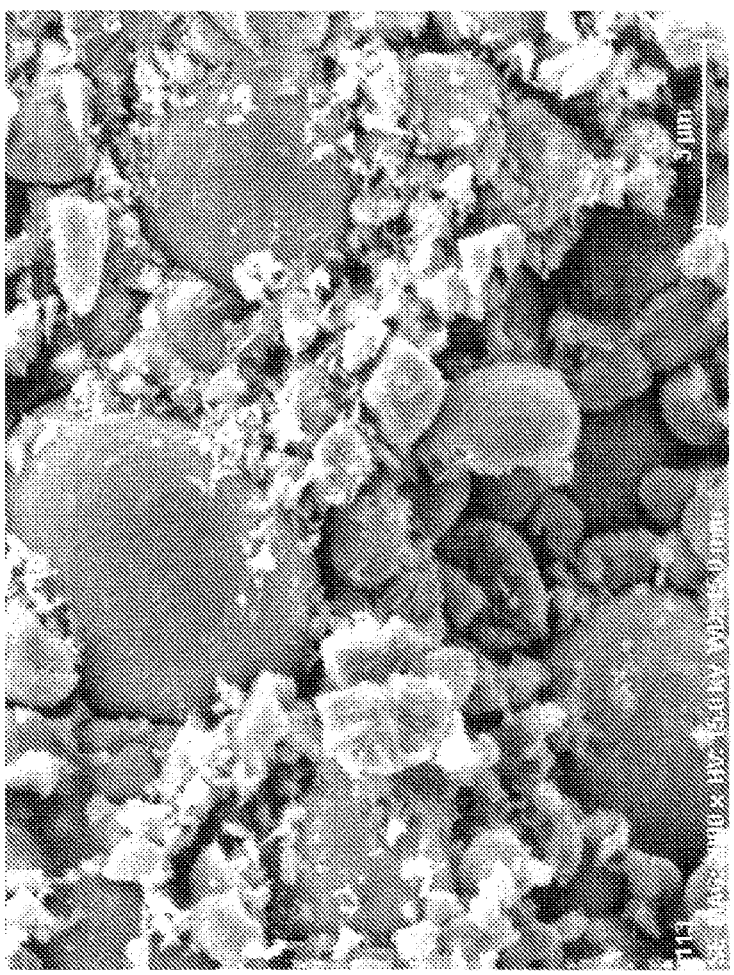
FIG. 10 shows an SEM observation image of nickel hydroxide particles (conventional art) coated with cobalt hydroxide.

Further, reaction resistance was measured as AC impedance at the 0th cycle, 600th cycle, and 1000th cycle under the following conditions:

Voltage: OCV (open-circuit voltage)±5 mV
Measurement frequency: 100 kHz to 50 mHz FIG. 8 shows an equivalent circuit used in impedance analysis. In FIG. 8, R1 corresponds to ohmic resistance (solution resistance or contact resistance); R2+R3 correspond to reaction resistance; W1 corresponds to diffusion resistance; and CPE2 and CPE3 correspond to electrode capacitance.

For each electrode extracted after being fully discharged at 0.2 C to a cutoff voltage of 1 V, the XAFS (X-ray absorption fine structure) at the K absorption edge of the nickel atom in the positive electrode active material was measured and analyzed by using BL16B2 at SPring-8. The amount of nickel oxyhydroxide remaining in each electrode after the discharging was calculated based on comparison with analysis results of nickel hydroxide and nickel oxyhydroxide both used as reference materials. The calculated amount of nickel oxyhydroxide was determined to be the amount of inactive nickel. Table 2 shows these test results.

TABLE 2

| Measurement Item | | Working Example | Comparative Example |
|---|---|---|---|
| Capacity Retention Rate (relative to initial capacity) | 0th cycle | 100% | 100% |
| | 600th cycle | 100% | 99% |
| | 1000th cycle | 100% | 79% |
| Reaction Resistance (SOC 10%) | 0th cycle | 2.6 mΩ | 2.0 mΩ |
| | 600th cycle | 1.9 mΩ | 6.7 mΩ |
| | 1000th cycle | 3.6 mΩ | 36.1 mΩ |
| Amount of Inactive Ni | 0th cycle | 0% | 0% |
| | 600th cycle | 0% | 0% |
| | 1000th cycle | 2% | 24% |

As shown in Table 2, the capacity retention rate at the 1000th cycle of the secondary battery of the comparative example was 79%, whereas the capacity retention rate at the 1000th cycle of the secondary battery of the working example was 100%. Thus, it was confirmed that the secondary battery of the working example exhibited superior charge/discharge cycle-life performance. The reaction resistance at SOC 10%, i.e., at a low state of charge, of the secondary battery of the comparative example was 6.7 mΩ after the 600th cycle and 36.1 mΩ after the 1000th cycle, whereas the reaction resistance at SOC 10% of the secondary battery of the working example was 1.9 mΩ after the 600th cycle and 3.6 mΩ after the 1000th cycle. Thus, significant improvement in the reaction resistance was observed in the secondary battery of the working example. Moreover, after the charge/discharge cycle tests, production of inactive nickel oxyhydroxide was observed in the secondary battery of the comparative example. On the other hand, it was confirmed that such production of inactive nickel was significantly suppressed in the secondary battery of the working example.

From these measurement results, in the secondary of the working example, it has been confirmed that even after charge/discharge cycles are repeated, the production of inactive nickel is suppressed and thereby an increase in the internal resistance at the end of discharge is suppressed, and consequently, excellent charge/discharge cycle-life performance can be obtained.

(Durability Test)

Figure 11:
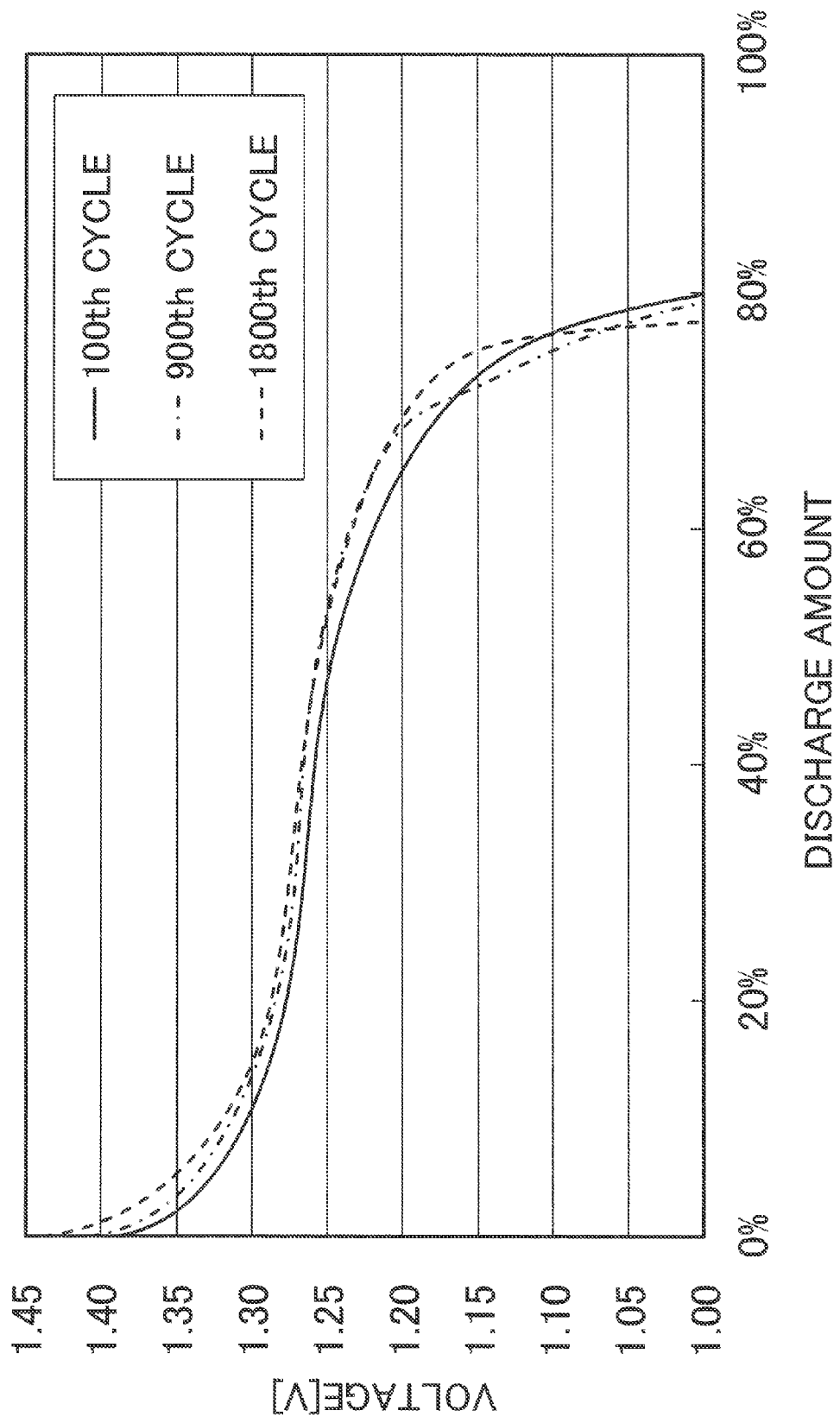
FIG. 11 shows discharge curves of a nickel-metal hydride secondary battery of a comparative example.

Next, in the nickel-metal hydride secondary battery of the working example and the nickel-metal hydride secondary battery of the comparative example, charging and discharging were repeated under the conditions of current value 2 C and charge amount 80%. FIG. 11 shows discharge curves of the nickel-metal hydride secondary battery of the comparative example. At the 100th cycle, the discharge amount was 80% corresponding to the charge amount of 80%. The discharge amount decreased in accordance with an increase in the number of performed charge/discharge cycles, and at the 1800th cycle, the discharge amount decreased to approximately 77% (the discharge amount was approximately 96% of the charge amount).

Figure 12:
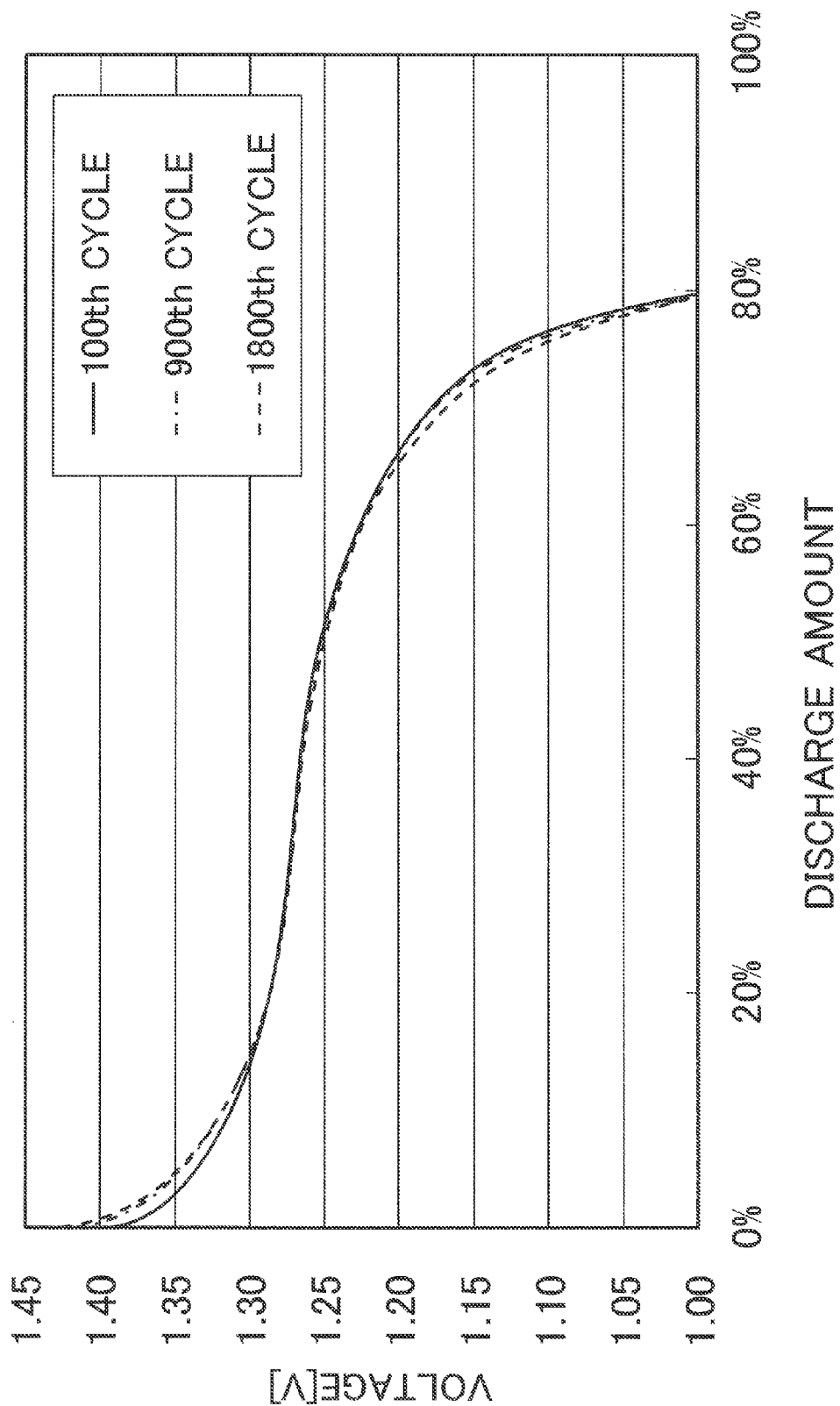
FIG. 12 shows discharge curves of a nickel-metal hydride secondary battery of a working example.

FIG. 12 shows discharge curves of the nickel-metal hydride secondary battery of the working example. Even at the 1800th cycle, the discharge amount was substantially the same as the charge amount. That is, even after 1800 charge/discharge cycles were repeated, almost no decrease in the discharge amount was observed in the nickel-metal hydride secondary battery of the working example, and thus excellent durability was confirmed.

Figure 13:
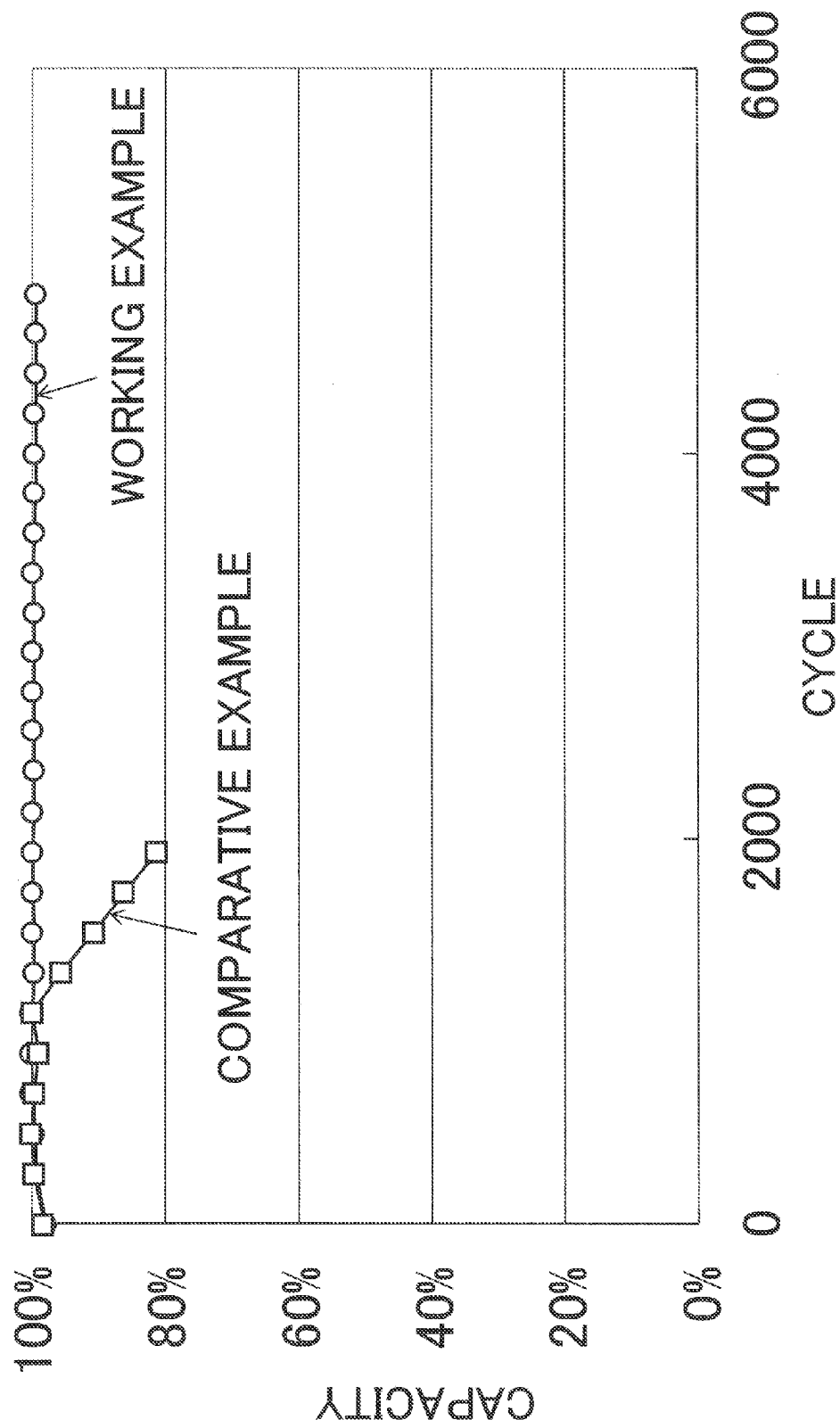
FIG. 13 shows a graph relating to capacity test results on the nickel-metal hydride secondary battery of the working example and the nickel-metal hydride secondary battery of the comparative example.

Further, in the nickel-metal hydride secondary battery of the working example and the nickel-metal hydride secondary battery of the comparative example, charging and discharging were repeated under the conditions of current value 0.2 C and charge amount 80%, and changes in battery capacity were monitored. FIG. 13 shows a graph relating to capacity test results on the nickel-metal hydride secondary battery of the working example and the nickel-metal hydride secondary battery of the comparative example. The capacity of the nickel-metal hydride secondary battery of the comparative example decreased rapidly after the 1200th cycle, and became approximately 80% of the initial capacity at the 2000th cycle. On the other hand, the capacity of the nickel-metal hydride secondary battery of the working example showed almost no decrease even at the 5000th cycle. Thus, the nickel-metal hydride secondary battery of the working example was confirmed to have exceptional durability compared to the nickel-metal hydride secondary battery of the comparative example.

Although the preferred embodiment of the present invention is described above with reference to the drawings, various additions, modifications, and deletions can be made without departing from the spirit of the present invention.

REFERENCE SIGNS LIST

1: alkaline storage battery
13: positive electrode
31: positive electrode active material particle (secondary particle)
32: positive electrode active material particle (primary particle)
33: positive electrode conductive agent
34: positive electrode active material particle coated with positive electrode conductive agent
35: microparticulated positive electrode conductive agent
36: conductive network

The invention claimed is:

1. A method of fabricating an alkaline storage battery positive electrode, comprising the steps of:
    (A) fixing active material particles to a current collector, a surface of the active material particles being coated with conductive agent particles, the conductive agent particles containing a cobalt compound as a main component; and
    (B) reducing the cobalt compound of the conductive agent particles such that a cobalt atom in the cobalt compound has an oxidation number of less than +2, by applying a reduction current in an electrolyte solution to the current collector to which the active material particles are fixed, after the step (A) wherein
    the active material particles are formed as aggregates of nickel hydroxide particles, and
    the cobalt compound of the conductive agent particles is at least one kind of cobalt compound selected from the group consisting of cobalt hydroxide, tricobalt tetroxide, and cobalt oxyhydroxide.

2. The method of fabricating an alkaline storage battery positive electrode according to claim 1, further comprising the step of:
    (C) oxidizing the cobalt compound of the conductive agent particles into tricobalt tetroxide or cobalt oxyhydroxide by applying a current in a charging direction to the current collector to which the active material particles are fixed, after the step (B).

3. The method of fabricating an alkaline storage battery positive electrode according to claim 1, wherein
    the step (B) is performed before alkaline storage battery activation.

4. The method of fabricating an alkaline storage battery positive electrode according to claim 1, wherein
    in the step (B), at least 1 atomic % of the conductive agent particles are formed as metallic cobalt particles or cobalt compound particles having a particle diameter of not less than 1 nm and not more than 3 nm, the cobalt atom in the cobalt compound particles having an oxidation number of less than +2.

5. The method of fabricating an alkaline storage battery positive electrode according to claim 2, wherein
    in the step (C), 30 atomic % or more of the cobalt compound of the conductive agent particles is formed as tricobalt tetroxide.

* * * * *